April 26, 1960 J. C. LOGUE ET AL 2,934,270

BINARY COUNTER UNIT USING WEIGHTED WINDING LOGIC ELEMENTS

Filed Dec. 31, 1954

INVENTORS
JOSEPH C. LOGUE
GEORGE D. BRUCE
BY [signature]
ATTORNEY

United States Patent Office 2,934,270

Patented Apr. 26, 1960

2,934,270

BINARY COUNTER UNIT USING WEIGHTED WINDING LOGIC ELEMENTS

Joseph C. Logue, Poughkeepsie, and George D. Bruce, Wappingers Falls, N.Y., assignors to International Business Machines Corporation, New York, N.Y., a corporation of New York Application December 31, 1954, Serial No. 479,079

5 Claims. (Cl. 235—176)

Figure 1:
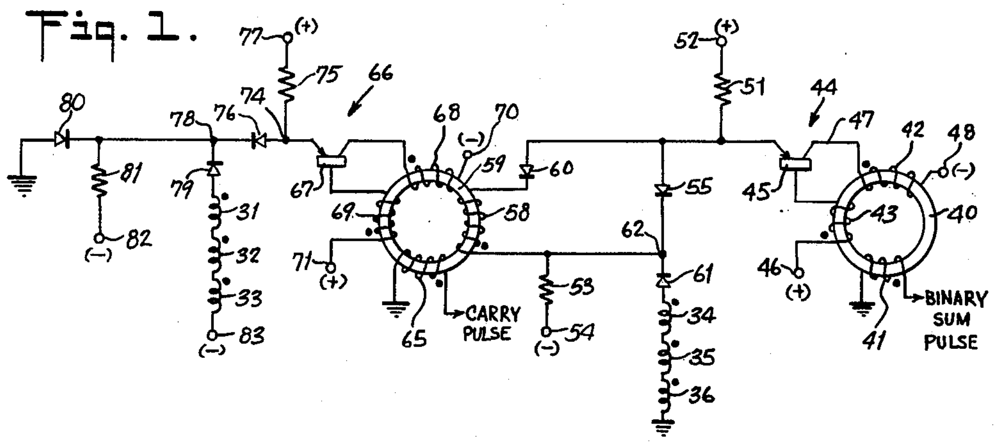

This invention is concerned with a binary adder unit. More specifically it is concerned with a unit for handling pulses in logical circuits representing binary digits.

The invention includes a circuit which has two outputs, one for binary sum pulses, and the other for carry pulses. It is to be understood that the unit of this invention is an element which will be employed in a binary adding system. The unit of this invention is an element for handling a single order in a binary number adding system. The invention is described herein as applied to a non-memory adder.

It is an object of this invention to provide a unit which employs weighted winding logic, i.e., wherein the occurrence of a particular condition is given more weight in a system than the occurrence of some other condition in order to produce desired results under specific conditions.

Another object of this invention is to provide a counter unit for a binary adder circuit such that the unit will produce a pulse representing the occurrence of a binary sum upon receipt of one input pulse representing either an augend, an addend, or a carry from a preceding order digit. The unit will also produce a binary sum pulse upon receipt of all three of the above-named input pulses, while it will not produce any binary sum pulse if only two of the above input pulses are received. In addition, the unit has provision for producing a carry pulse distinct from the binary sum pulse. Such carry pulse is produced only if two or more of the augend, addend, and carry input pulses are received.

Briefly, the invention includes a counter unit for one order of a binary counter. Such unit has input windings for receiving equal amplitude pulses that represent an augend, an addend, and a carry from the preceding order. The unit also comprises means for generating a binary sum output pulse upon receipt of any one of said three representative pulses alone. The unit also comprises means for generating a carry pulse and simultaneously inhibits said binary sum pulse upon receipt of only two of said three representative pulses. The said unit operates to generate a binary sum pulse and also a carry pulse upon receipt of all three of said three representative pulses.

A specific embodiment of the invention is described in some detail and set forth by way of illustration in the drawings, in which:

Fig. 1 shows a circuit diagram illustrating a unit according to this invention; and Figs. 2–6 illustrate various combinations of elements for obtaining desired results using weighted winding logic.

In Figs. 2–6, there are shown various examples of means for obtaining an output pulse upon particular input conditions. These illustrations will serve to make clearer the specific application of this invention that is illustrated in Fig. 1.

A basic conception involved in this invention is that of employing windings for introducing signal pulses into a circuit, which windings have predetermined weighted relationships in order to produce an output pulse upon the fulfillment of desired predetermined input conditions.

Figure 2:
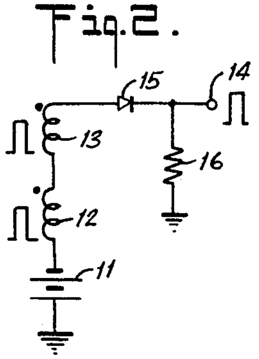
Figure 3:
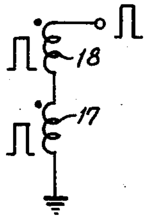

For example, in Fig. 2 there is shown a battery 11 that has a voltage generated therein equal to the amplitude of a unit pulse, such as the smaller of the two amplitude pulses illustrated in these figures. The polarity of battery 11 is the reverse of that of the positive pulses, i.e. the battery may be considered as a negative unit of voltage (its plus terminal being connected to ground). A first winding 12 is connected to one side of the battery 11 while the other side of the battery is grounded as illustrated. The polarity of the winding 12 is opposite to that of the battery 11 and may be considered positive. This polarity is indicated by the dot adjacent to the winding. Connected in series with the winding 12 and battery 11 there is a similar winding 13 that also is arranged to have a positive polarity, i.e. the pulse generated in this winding 13 will be a positive pulse as indicated by the showing of a positive pulse wave form adjacent to the winding 13. There is an output terminal 14 where an output pulse (as indicated by the pulse representation illustrated adjacent to the terminal 14) is produced when the desired conditions are met. It will be clear upon inspection that in order to produce a unit output pulse at the terminal 14 there must be simultaneously present both a pulse in the winding 12 and one in the winding 13. This is because the bias battery 11 is connected in a negative direction and the occurrence of either pulse alone would produce no output. It will be appreciated that the voltage of the battery 11 is equal to the amplitude of the pulses being considered. This amplitude and voltage may be considered unity for the purposes of this explanation. It will be appreciated that a clipper composed of a diode 15 and a resistor 16, as shown, will insure an output pulse of unit height above ground.

Similarly, desired logical results may be obtained by using various circuit combinations and particularly by including a variation in the size of certain of the windings. For example, in Fig. 3, there is shown a pair of windings 17 and 18 connected in series and having the same polarity. As illustrated, in order to produce an output pulse having the unit amplitude, a pulse may be applied to either the winding 17 or the winding 18 exclusively.

Figure 4:
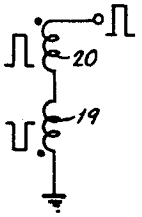

Another variation is that shown in Fig. 4 where a winding 19 is connected in series with a winding 20, but in this instance the polarity of winding 19 is reversed, as indicated by the dot being located at the lower end of this winding. Consequently, the applicaiton of a pulse in winding 19 will act to inhibit an output from the circuit. In other words, an output pulse is obtained when the input pulse to winding 20 is received alone without the simultaneous receipt of a pulse in the reverse polarity winding 19.

Figure 5:
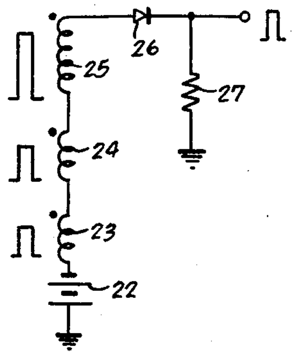

In Fig. 5 there is illustrated another result that may be obtained where an output pulse represents somewhat more complex input conditions. There is shown a battery 22 that is connected with reverse polarity, i.e. its voltage may be considered a negative unit. In series with battery 22 there is connected a winding 23, another winding 24 and a third winding 25 that has twice the number of turns as either of the first two windings 23 and 24. In addition, it will be noted that the polarity of all three windings is the same (positive) as indicated by the dot in each case being at the top of the winding. In this circuit an output pulse will be received upon the application of either the double amplitude pulse, as produced in the winding 25, or both of the unit amplitude pulses from windings 23 and 24. However, not if only one of the unit pulses in windings 23 or 24 is received alone. The manner of obtaining this result should now be quite apparent in view of the above explanation in connection with Fig. 2, e.g. the negative bias battery 22 in this case will oppose one unit of amplitude in the input and therefore there must be two units of amplitude in the input in order to produce the output pulse as illustrated. Also, as in Fig. 2, the use of a clipper composed of a diode 26 and a resistor 27 connected at the output as shown, will insure an output of unit height above ground.

Figure 6:
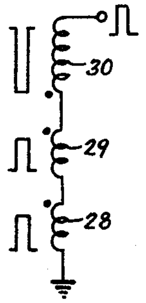

Finally, in Fig. 6, another situation is illustrated wherein there is a winding 28 in series with a winding 29 and a double length winding 30. It will be noted that the polarity of the winding 30 is reversed as shown by the dot at the lower end of the winding, and also by the illustration of the double amplitude pulse being negative. Such a circuit produces an output pulse only when one of the pulses from winding 28 or winding 29 is received alone, assuming that the double amplitude negative pulse does not occur at this time. Should both of the pulses from windings 28 and 29 be simultaneously received, it is assumed that the pulse in winding 30 (being two units of amplitude in size and having a reverse polarity) will also be received and will cancel out the effect of the input pulses so that no output pulse will be produced.

An application of the above-described logical condition indications is illustrated in a particular use in connection with a unit which may be used in a binary adder as one order digit for any given binary number. It will be appreciated by one skilled in the art that a binary number is composed of a group of "0's" and "1's" for as many orders as the number is carried to. In an adder for use in connection with binary numbers it is most common to represent a binary "one" (1) by a pulse which may be used to perform some function if desired, e.g. to control a register, etc. In such case the binary "zero" (0) is represented by the absence of a pulse. In binary numbers, when addition is performed, there are two sources of change for a given order digit of an augend. One of these is the same order digit of the addend, and the other is a carry from the next lower order digit of the number. Consequently, in an adder circuit for use with binary numbers where no memory is involved, i.e. where the presence or absence of a "one" is only momentary, there must be provision for three inputs and two outputs. The three inputs are for receiving pulses representing the augend, the addend and the carry from the next lower order. The two outputs represent the sum and carry for that order. An illustrative example is the following:

| | | | | |
|---|---|---|---|---|
| Augend | 0 | 1 | 1 | 0 |
| Addend | 0 | 1 | 0 | 1 |
| Sum | 0 | 0 | 1 | 1 |
| Carry | 0 | 1 | 0 | 0 |

In the example, it is to be noted that the sum shown is not the true sum of the augend and the addend, because the carry has not been added to the next higher order. When a unit for a single order of a binary adder is connected into a full adder the carry from each order will affect the next higher order so that the true sum in the above example would be 1 0 1 1.

Referring to Fig. 1, it will be noted that, as before, the polarity of the various windings that are illustrated, is indicated by a dot located adjacent to one end or the other of each winding. There are six input windings 31–36. These windings may be secondaries of transformers or the like, and will have produced therein pulses having a given amplitude all occurring simultaneously if they occur. The pulses as generated in these windings will represent three binary situations. That is, there will be introduced or generated at a given pair of these windings a pulse representing an augend. Likewise, there will be introduced or generated in another pair of these windings, a pulse representing an addend, while in the third pair of these windings there will be introduced or generated a pulse representing a carry from the next preceding lower order, in a binary adding circuit. Thus, windings 31 and 34 may be considered as receiving an augend pulse, windings 32 and 35 may be considered as receiving an addend pulse and windings 33 and 36 may be considered as receiving a "carry from the next lower order" pulse. It will be remembered that the occurrence of any one or more of these three pairs of pulses will be simultaneous.

At the right side of Fig. 1 there is shown a magnetic material core ring 40 which has wound thereon an output winding 41 that produces a pulse representing a binary sum, for the given order in a binary number to which the unit of Fig. 1 is assigned. Also wound on the core 40 there is a winding 42 and another winding 43. Connected in circuit with the windings 42 and 43, there is an amplifier 44 which may be a transistor 45, as illustrated, that has its base connected to one end of the winding 43. The other end of the winding 43 is connected to a positive bias source of voltage, as indicated by the plus sign adjacent to a terminal 46. Connected to the collector of the transistor 45 by a wire 47, is one end of the winding 42, the other end of which winding is connected to a terminal 48 that has a relatively high negative voltage connected thereto in the usual manner for a point contact type of transistor. The emitter of transistor 45 has conneced thereto one end of a resistor 51 that has its other end connected to a terminal 52.

Other elements in the circuit for the emitter of the transistor 45 include another resistor 53, that is connected to a terminal 54 which has a negative voltage supply connected thereto as indicated by the minus sign adjacent to the terminal 54. In addition, there is a diode or rectifier 55 that is connected as illustrated between the extremities of resistor 51 and resistor 53 so as to allow passage of current flow from the positive voltage supply (connected to the voltage terminal 52) to the negative voltage supply (connected to the voltage terminal 54). The relative values of resistors 51 and 53 are such that the voltage applied to the emitter of transistor 45 is somewhat more negative than the positive bias volage that is applied to the base for transistor 45 at terminal 46. Consequently under normal conditions, the transistor 45 is cut off and no current flow takes place through the windings 42 and 43.

Also, among the elements in the circuit with the emitter of transistor 45, there is a winding 58 located on another magnetic core 59. In series with the winding 58 there is a diode or rectifier 60. It will be noted that the polarity of the winding 58 is opposite to that of the other windings on the core 59.

Also included in the emitter circuit of transistor 45 there are the three input signal windings 34, 35 and 36 which are connected in series with one end connected to ground as illustrated, and the other end connected to one side of a diode or rectifier 61. The other side of diode 61 is connected to a point 62, located between one end of the resistor 53 and one side of the diode 55.

It is pointed out that the occurrence of a single pulse in any one of the windings 34, 35 or 36 will raise the potential of the point 62 above zero or ground potential sufficiently to cut off the flow of current through the diode 55, so that current flow from the positive source connected to terminal 52, will be diverted to the emitter of the transisor 45. Therefore the transistor will pass current from its collector to its base, which current will flow through the winding 42 as well as the winding 43 on the core 40. In this manner, a corresponding but amplified pulse is produced in the windings 42 and 43 on the core 40.

It is to be noted that the interaction between windings 42 and 43 (because of the mutual coupling therebetween) is such as to produce a sharpened or more exactly "square" wave pulse by means of a regenerative feedback action. This pulse will generate an output binary sum pulse from the winding 41, as indicated by the caption in the drawings.

In order to inhibit the production of an output pulse in the binary sum pulse winding 41 of the magnetic core 40, when only two of the three input pulses are received in windings 34, 35 and 36, there is a circuit including the winding 58 on core 59. The core 59 also contains a carry pulse winding 65. Furthermore, there is another amplifier 66 which includes a transistor 67 and two windings 68 and 69 on the core 59.

A terminal 70 is connected to one end of the winding 68, and the other end of that winding is connected to the collector of transistor 67. The base of transistor 67 is connected to one side of the winding 69 while the other side thereof is connected to a terminal 71. In this instance the emitter of transistor 67 is connected to a point 74, that is a junction between one terminal of a resistor 75 and one side of a diode 76. The other terminal of the resistor 75 is connected to a terminal 77 which has a positive voltage source connected thereto.

Connected to the other side of diode 76 is a junction 78 to which are connected the diode 76 and another diode 79, as well as a third diode 80. The other side of the diode 80 is connected to ground as illustrated, so that the diode 80 acts as a clamping diode to maintain the voltage of the point 78, at the potential of ground or above. Also connected to the point 78, there is a resistor 81 that has the other end thereof connected to a terminal 82 which is connected to a negative voltage source as indicated on the drawing. The diode 79 has connected to the other side thereof, from the point 78, the three input windings 31, 32 and 33, in series. The other end of this series connection of windings 31–33 is connected to a terminal 83 that has a negative bias voltage connected thereto, which bias is of a value equal to the amplitude of any one of the input pulses referred to above. It will be noted that the polarity of the windings 31–33 is positive, i.e. the pulses as received in these windings have a positive polarity which is opposite to that of the negative bias voltage connected to the terminal 83.

*Operation*

The operation of the unit as illustrated in Fig. 1 may be described beginning with the second magnetic core and its associated amplifier, i.e. the core 59 and amplifier 66. When no pulses are received in the windings 31, 32 or 33, the transistor 67 remains non-conducting because the positive bias voltage as connected at the terminal 71 is higher than the potential at point 74 which is maintained at ground or zero potential by reason of the clamping diode 80. The relative values of resistors 75 and 81 are such that the potential of point 74 would tend to be somewhat below ground or zero potential if it were not for the clamping diode 80.

When two or more pulses are simultaneously received in the windings 31, 32 and 33, the negative bias source (equal to the amplitude of one pulse) which is connected to the terminal 83, will be overcome and the diode 79 will allow current to flow which will drive the point 78 positive with respect to ground and thereby cut off current flow through the diode 76. This action will divert the current flow from the positive source connected to the terminal 77 (via the resistor 75) to the emitter of transistor 67 and consequently will cause transistor 67 to conduct. Consequently, current will flow in the windings 68 and 69 on the core 59 in a manner similar to that described above in connection with the transistor 45 and magnetic core 40. This current flow or pulse in windings 68 and 69 will generate an output pulse in the winding 65, which represents a carry for the given binary order. At the same time a pulse of double amplitude will be produced in the winding 58 which has a greater number of turns than the other windings on the core 59. It will be noted that the output pulse as produced in winding 58 has a reverse polarity from the other pulses in the system as indicated by the dot near the lower end of the winding 58.

It will be observed that the reverse polarity pulse produced in the winding 58 of the core 59 is applied to the circuit connected to the emitter of transistor 45, in series with the input windings 34, 35 and 36. Consequently, when there are two input pulses received by the whole unit, there is a carry pulse generated in the winding 65 but there is no binary sum pulse generated in the winding 41. This is because the double amplitude reverse polarity pulse is simultaneously generated in the winding 58 to oppose the two pulses as generated in two of the windings 34, 35 and 36. Consequently the transistor 45 is not rendered conducting and no signal or pulse is created in the binary sum winding 41 of the core 40.

It will now be appreciated that whereas the occurrence of any one input pulse alone will cause an output pulse to be generated in the winding 41, it will not cause any pulse to be generated in the carry pulse winding 65 or the reverse polarity double amplitude winding 58 of the core 59. The reason for the non-generation of a carry or double amplitude reverse polarity pulse is the negative bias voltage that is constantly applied at the terminal 83. When, however, there are two or more of the input pulses applied to the windings 31–36, a carry pulse is generated in the winding 65 and also a double amplitude reverse polarity pulse is generated in the winding 58. Because the double amplitude reverse polarity pulse was generated in the winding 58, no signal will be generated in the output binary sum winding 41 if only two of the input pulses were received. However, if three of the input pulses were received, then the double amplitude reverse polarity pulse generated in winding 58 will only cancel out two of these pulses, leaving the third pulse to affect the emitter circuit of the transistor 45 so as to cause this transistor to conduct and thereby to produce a pulse in the binary sum winding 41.

It will be noted that in order to assure the presence of the double amplitude reverse polarity pulse at the time of the generation of the input pulses to the unit, the number of turns of the winding on the core 59 may be adjusted or the pulses that are applied to the input windings 34, 35 and 36 may be slightly delayed.

It will be appreciated that the unit shown in Fig. 1 may be used as an element in a full adder. In such case any given pair of the input windings 31–36, e.g. 31, 34 or 32, 35 or 33, 36, may be connected to receive pulses from the winding corresponding to the carry pulse winding 65, on the unit for the next preceding lower order.

While a specific embodiment of this invention has been illustrated in some detail in accordance with the applicable statutes, this is not to be taken as in any way limiting the invention, but merely as being descriptive thereof.

It is claimed:

1. A counter unit for a given order digit of a binary counter, said counter unit having input windings for receiving equal amplitude pulses representing an augend, an addend and a carry from the preceding order respectively comprising a first magnetic core having a plurality of windings thereon including an output winding for generating a binary sum pulse, a first amplifier having an output circuit including some of said plurality of core windings, an input circuit for said amplifier including a potentiometer having two resistors in series with a diode therebetween for holding the amplifier cut off in the absence of said representative pulses, three of said counter unit input windings being connected in series with a diode, the other side of which is connected to the opposite side of said first-named diode from the amplifier input, a second magnetic core having a plurality of windings thereon including an output winding for generating a carry pulse in said unit, a reverse polarity double amplitude pulse generating winding on said second core, circuit means connecting said double amplitude pulse winding in series with three of said counter unit input windings and the input to said first amplifier, a second amplifier having an output in circuit with some of the plurality of windings on said second core, an input circuit for said second amplifier including three of said counter unit input windings in addition to a reverse polarity bias voltage having an amplitude equal that of one of said pulses, so that when only one of said pulses is received no output is had from said second amplifier but when two or more pulses are simultaneously received both said unit carry pulse and said double amplitude reverse polarity pulse are generated simultaneously all whereby correct binary sum and carry pulses will be generated for any combination of binary input pulses into the unit.

2. A counter unit for a given order digit of a binary counter, said unit having input windings for receiving equal amplitude pulses representing an augend, an addend and a carry from the preceding order respectively comprising a first magnetic core having a plurality of windings thereon including an output winding for generating a binary sum pulse, a first transistor having its collector and base connected in series with two of said plurality of core windings, a potentiometer having two resistors in series with a diode and being connected to the emitter of said first transistor, three of said counter unit input windings being connected in series with a diode the other side of which diode is connected to the emitter of said first transistor, a second magnetic core having a plurality of windings thereon including an output winding for generating a carry pulse in said unit, a reverse polarity double amplitude pulse generating winding on said second core, circuit means connecting said double amplitude pulse winding in series with said three counter unit input windings in the circuit of the emitter of said first transistor, a second transistor having its collector and base connected in series with two of said second magnetic core windings respectively, a second potentiometer having two resistors in series with a diode, means connecting the emitter of said second transistor to one side of the diode in series with said second potentiometer, three other of said unit input windings being connected in series with a diode and with a reverse polarity bias voltage equal to the amplitude of one of said representative pulses and having the other side of the diode connected to the emitter of said second transistor all whereby the simultaneous presence of a representative pulse in a corresponding pair of said six unit input windings will produce an output pulse in said binary sum winding on said first magnetic core, while the presence of two representative pulses simultaneously in two pairs of said unit input windings will produce no output pulse in said binary sum pulse output winding but will produce a carry pulse in said carry pulse winding on said second magnetic core, and the presence of all three of the representative pulses in the three pairs of unit input windings simultaneously will produce a pulse in both said binary sum winding and said carry winding.

3. A carry circuit for one order of a binary counter including three input windings for receiving equal amplitude potential pulses representing respectively an augend, an addend, and a carry from a preceding order, a source of direct potential equal to the amplitude of one of said pulses, a diode, and means connecting said windings, said source and said diode in a series branch circuit with the polarity of the source opposed to that of the pulses, said diode being connected to transmit a current in its low impedance direction in response to potentials of the polarity of said pulses, said source being effective to reversely bias the diode and thereby to prevent current flow therethrough until pulses are simultaneously received at two of said windings, and including an amplifier comprising a transistor having an emitter electrode, a base electrode and collector electrode, a source of direct current, a second diode connected in series with the current source and poled to pass current therefrom, an emitter current input circuit for said transistor including a connection between the emitter electrode and the common terminal of said source and said second diode, means connecting said series branch circuit to the other terminal of the second diode, further circuit means connected to said other terminal of the second diode and cooperating therewith to shunt said emitter current input circuit when no current is flowing in said series branch circuit, said series branch circuit being effective when a current is flowing therethrough to bias the second diode reversely and block the current flow therethrough, whereupon current flows from said current source through the emitter current input circuit, carry signal output means, and means operatively connecting said carry signal output means to the collector and base electrodes of the transistor.

4. A binary counter circuit, comprising, for one binary order, two sets of three input windings each, each set of three windings being connected to receive equal amplitude potential pulses representing respectively an augend, an addend, and a carry from a preceding order; a carry circuit comprising one of said sets, a source of direct potential equal to the amplitude of one of said pulses, a diode, and means connecting said windings, said source and said diode in a branch series circuit with the polarity of the source opposed to that of the pulses, said diode being connected to transmit a current in its low impedance direction in response to potentials of the polarity of said pulses, said source being effective to reversely bias the diode and thereby to prevent current flow therethrough until pulses are simultaneously received at two of said windings; an amplifier having an input and an output, a carry signal output winding connected to said output, and a double amplitude output winding connected to said output, and means connecting said series circuit to the amplifier input and cooperating therewith to produce output pulses in the carry output winding and the double amplitude output winding when current flows through said series circuit; a sum circuit comprising the other of said sets of windings, a second diode, and means connecting said other set of windings in a series circuit with said second diode and said double amplitude winding, said second diode being poled to transmit pulses from the windings of said set in its low impedance direction, said double amplitude winding being poled so that its pulses oppose the pulses of the set of windings, whereby a potential pulse is produced across said series circuit when a pulse is received at a single winding of said set or when pulses are received simultaneously at all three windings of the set, said carry circuit and said double amplitude winding cooperating to block any pulse across the series circuit when pulses are received simultaneously at two only of the windings of the set.

5. A binary counter circuit as defined in claim 4, including a second amplifier having an input and an output, a sum output winding connected to said second amplifier output, and means connecting said series circuit to said second amplifier input.

References Cited in the file of this patent

UNITED STATES PATENTS

| | | |
|---|---|---|
| 2,671,607 | Williams | Mar. 9, 1954 |
| 2,679,040 | Gloess | May 18, 1954 |
| 2,695,993 | Haynes | Nov. 30, 1954 |

OTHER REFERENCES

Auerbach et al.: "The Binac," Proceedings of the I.R.E., January 1952, page 19, Figure 9–B relied on.